June 26, 1956  J. G. ATWOOD ET AL  2,752,479
SIGNAL LIGHT PROJECTOR

Filed Dec. 2, 1952  4 Sheets-Sheet 3

INVENTOR.
Joseph G. Atwood
Philip B. Clark
BY
Arnold C. Ericson
Attorney

United States Patent Office 2,752,479
Patented June 26, 1956

2,752,479

SIGNAL LIGHT PROJECTOR

Joseph G. Atwood, Wauwatosa, and Philip B. Clark, South Milwaukee, Wis., assignors to McGraw Electric Company, Milwaukee, Wis., a corporation of Delaware Application December 2, 1952, Serial No. 323,655

16 Claims. (Cl. 240—1.2)

The present invention relates to light projectors, and especially pertains to contact or runway marker lights for use on airports and the like to facilitate landing and take-off operations of aircraft.

It is common knowledge that light penetration of fog and other adverse weather conditions is entirely a function of candle power; and lights used in an airport lighting system to combat low-visibility conditions must be so designed and controlled that at no time during the landing will any beam of light fall on the eye of pilot in such degree as to impair the eye's maximum efficiency. Usable light is, therefore, a factor of point candle power versus background brightness. A point source of light of relatively low candle power concentrated and directed by proper control can be made more visible and useful than a standard type of non-controlled runway light of a much greater candle power.

Continued studies and operating practice have brought forth the introduction of controlled-beam runway light projectors for providing a glare-free signal to approaching aircraft under even the most adverse weather conditions. These units comprised a lamp and lens system which provided an extremely accurate control of the light beam. A set of these lights installed paralled with one another along both sides of the approach path and runway could be adjusted and controlled to provide correct brightness to the pilot when landing or taking off. Operation of the controlled unit is based on a fundamental and accepted formula, such as Allard's Law. In essence, Allard's Law provides that when a light just visible in an obstructing atmosphere, such as fog, is being observed and an uncontrolled light is placed between it and the observer, the light farther away becomes invisible because the light reflected off the atmosphere particles around the nearer light becomes brighter than the light emanating from the more distant source. The halo in fog is caused by light shining on the fog at an angle to the direct line of vision and of such intensity that it is reflected off, or refracted, by the drops of moisture making them visible. When the distribution and intensity of the light source are controlled so that direct light (with just sufficient candle power) penetrates the point of observation, the light appears as a point source and the halo, or fogging, of the atmosphere about it is kept to a minimum. Correct beam control minimizes the possibility of "glare barrage."

Under a controlled system with relatively clear atmospheric conditions, the main light path is projected substantially parallel to the runway at relatively low intensity. Obviously, under restricted visibility the light envelope shrinks, with the penetration of the higher candle power beams being reduced more than that of the lower candle power beams, according to Allard's Law. Therefore, the effective areas fall away from the center line of the runway. Merely increasing the output of the lamp does not restore the path of equal brightness. Only by refocusing and "toeing in" the path of the maximum candle power beam towards the center line of the runway, can the relatively darker area be eliminated and the path of equal brightness be restored. Controlled-beam light projectors have been in use as contact or runway marker lights for an effective length of time to prove their success in operation. However, the installations have proved to be of a considerable expense in initial construction costs and subsequent parts replacement and maintenance. In addition, these installations require elaborate control panels, which must be operated with considerable skill for maintaining the correct intensity and beam control setting. The installations also require separate pilot control lines for separately energizing the beam-control means apart from the circuit energizing projector lamp.

A very effective runway marker lamp has been provided as the subject matter of the copending application filed by Philip B. Clark on December 2, 1952, bearing the Serial No. 323,656, and assigned to the same assignee as the present invention. The structure disclosed and claimed in the copending application comprises a light projector which embodies a relatively inexpensive structure utilizing a simple mechanism for controlling the action of the light source with respect to the lens and/or reflector, and which may be provided to jointly cooperate with the optical system to project a signal at a predetermined intensity and beam direction in relation to the quantity of electrical energy supplied to the light source, or which may operate effectively through a separate pilot control circuit, where it is so desired.

One of the paramount contributions attributed by the lamp described in the above-mentioned copending application, is that is has materially reduced the degree of "human element" required to operate a controlled-beam unit. That is, previous beam-controlled runway lights were operated by means of two separate sets of controls, consisting of a brightness selector switch and a beam-position control switch. The control tower operator was first required to ascertain weather conditions. If the local weather bureau was equipped to give "on the spot" reports, then this data might be used for setting the lights. However, for "on the spot" accuracy, it is better for the control tower operator to determine existing visibilities from various reference points, such as prominent objects, buildings, trees, poles, etc., for day observation, and buildings that have windows lighted at night, obstruction lights, and other low intensity lights for night observation. After determining the visibility distance and relating this determination to a proper setting of the brightness control switch, the operator was additionally required to establish the proper beam deflection setting within established limits relative to the beam-position control switch. It will be apparent that there were at least three opportunities which might involve possibilities of human error.

The light projector of the above-mentioned copending application provides a means for eliminating nearly all human factors other than a determination of visibility conditions in terms of distance. That is, the projector automatically relates the projected candle power or emitted light to the desired "toe in" angle of the light beam. This is preferably accomplished by providing a light source and a prime mover for the light source which are jointly responsive to the amount of current supplied to the lamp.

The present invention constitutes a further improvement of the above-mentioned light projector. The preferred prime mover of that projector, or any prime mover, for that matter, provides a motion that is a substantially linear function of the current supplied thereto. However, continued studies have shown that the desired degree of deflection of the beam with relation to the candle power output is not a true linear relationship. It is therefore a primary object of the present invention to provide a tailoring means in combination with the prime mover of a controlled-beam light projector, whereby the deflection of the projected light beam will be a function of the degree of candle power required to penetrate a given adverse weather condition.

It is another object of the present invention to provide a means of deflecting the projected light beam of a runway light in a direct relationship to the candle power required to penetrate a given adverse weather condition, whereby the prime mover for deflecting the beam provides a substantially linear motion, and whereby the actual deflection required is an exponential function of the current supplied to the lamp and the prime mover.

It is a further object of this invention to provide a tailoring means in combination with a prime mover of a controlled-beam light projector, whereby the deflection of the projected light beam will be proportional to the degree of candle power required to penetrate a given adverse weather condition, and whereby said tailoring means may take any of various forms including eccentric cams, pivoted linkage members, or elliptical gears.

Referring now to the drawings.

Figure 1:
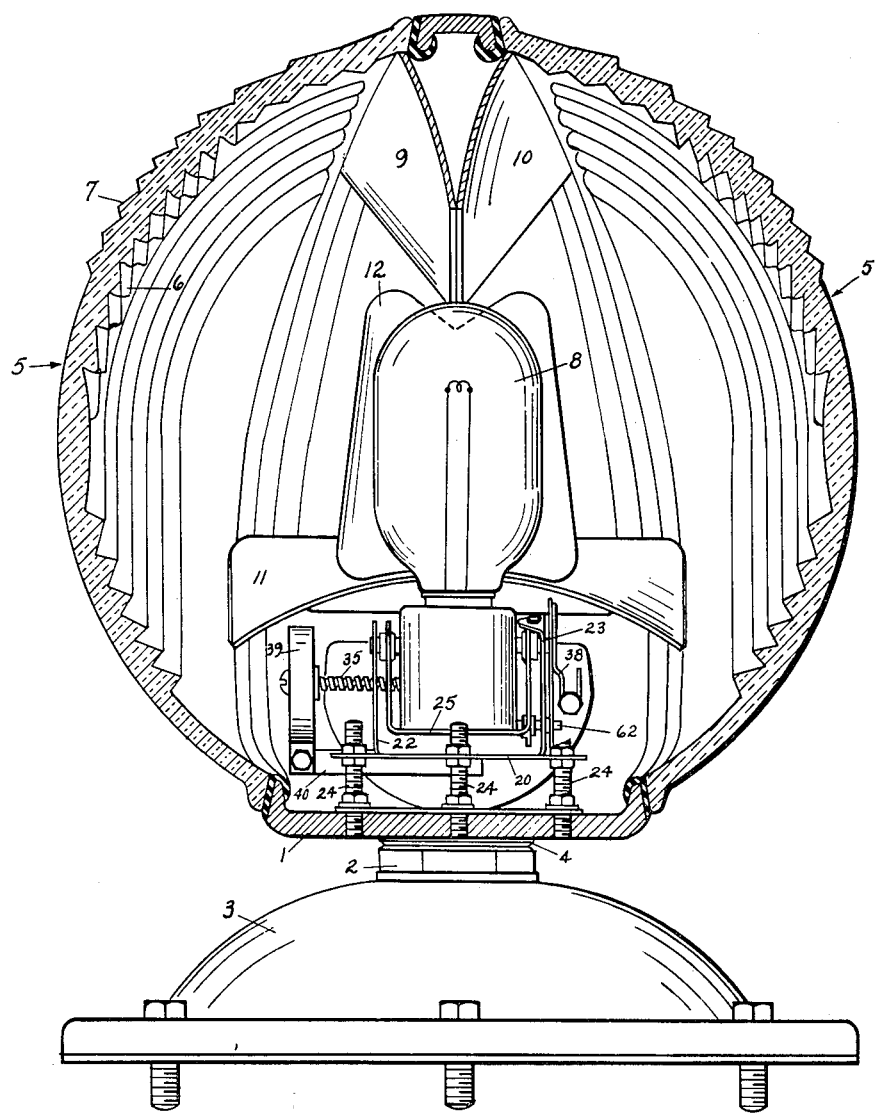
Fig. 1 is a side elevational view, partly in section, of a runway light projector incorporating the improved prime mover.
Figure 2:
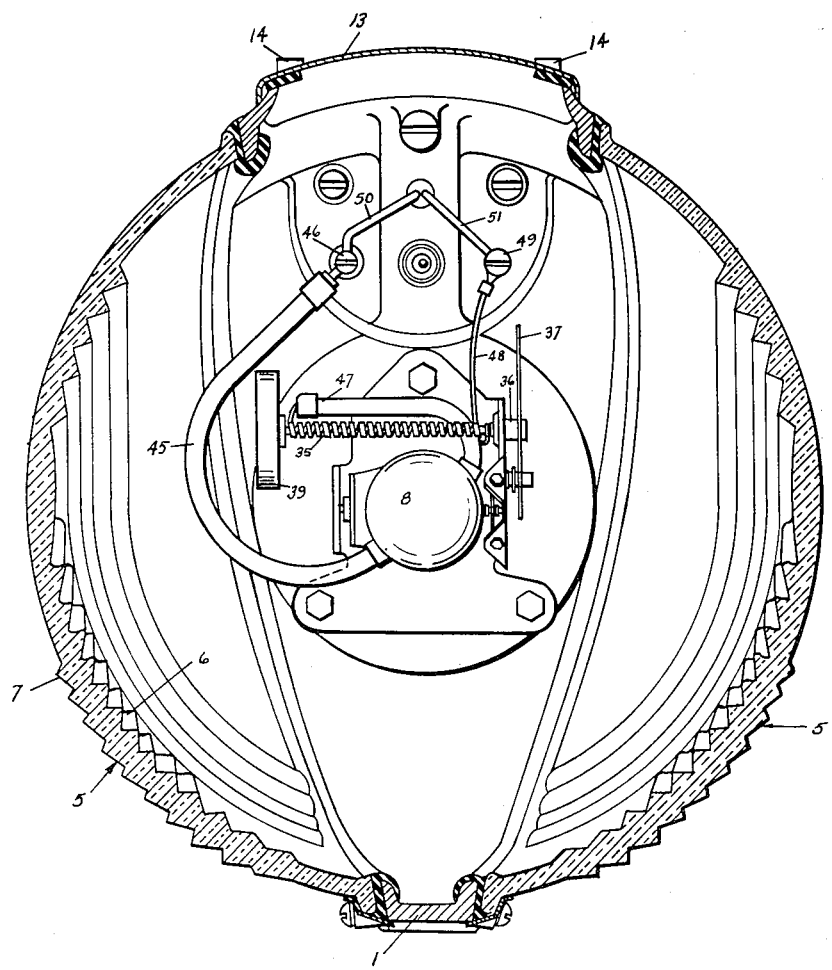
Fig. 2 is a top view, partly in section, and with the reflectors removed, of the improved runway light projector.

The improved runway light projector will be described with particular reference to the embodiment disclosed in Figs. 1, 2 and 3. The projector preferably comprises a cast housing member 1, supported by a vertical support member 2, which projects from a mounting base 3. The support member 2 is preferably provided with an annular break-off groove 4, which is made relatively frangible in order to shear on impact by approaching airplanes, snow plows, or other moving vehicles.

The optical system forms a part of the copending patent application, Serial No. 328,631, filed by Philip B. Clark, on December 30, 1952, and assigned to the same assignee as the present invention and is fully described therein. Inasmuch as the improved beam-control mechanism may be readily adaptable for use in any conventional beam-control light projector, it will be sufficient to describe the optical system in terms of its general components. The components for a dual lens unit include an interchangeable lens structure 5 comprising a concavo-convex lens adaptable for use on either side of the double ended projector. The lens 5 comprises a focusing portion, which includes inner and outer refracting prisms 6 and 7, respectively, a portion of which provides a "bulls-eye" focusing means.

The light source comprises a conventional projector type lamp 8. In order to gain full advantage of the light emanating from the lamp, a group of light collecting and reflecting reflectors may be provided, as shown in Fig. 1. The uppermost reflector, as used therein, is composed of two portions 9 and 10, respectively. These portions have a generally concave cross section and are preferably polished to provide specular reflection of light rays directed upwardly from the lamp towards the lens 5. A lower reflector 11 is arranged to principally collect light rays which would ordinarily fall on the relatively dull, light absorbing, parts therebelow, and to reflect these rays towards the dual lenses positioned on either side of the lamp 8. There is also shown a rear reflector 12, which may be positioned between the lamp 8 and the runway side of the casting 1 to reflect light away from that surface. It is to be noted that the runway side of the lamp is at the top as viewed in Fig. 2.

The housing 1 is preferably provided with a maintenance-entrance door 13 pivotally mounted on trunnions 14, and engageable with the housing at its free end by means of a conventional latching clamp (not shown). It will be apparent that the base 3 may be mounted directly on an individual transformer (not shown) or connected directly to a multiple circuit (not shown) in the usual manner.

The improved beam-control mechanism comprises a stationary frame assembly which includes a base portion 20, having upwardly extending trunnions 22 and 23 integral therewith. The frame assembly is supported by nut and stud assemblies 24, which permit the mechanism to be adjustable vertically with respect to the lens 5. The projector lamp assembly 8 is positioned in a U-shaped cradle member 25. The cradle member is pivotally supported from the trunnions 22 and 23 of the frame assembly by its upwardly extending, spaced leg portions.

The preferred manner of providing the desired movement of the light source with relation to the lens and/or reflectors has been fully described and claimed in the above-mentioned copending application, Serial No. 323,656. As shown in Figs. 1 and 2, the prime mover comprises a current-responsive bimetallic lamp actuator 35, which is caused to torsionally provide rotational motion due to its inherent ohmic resistance. The actuator comprises an elongated helically-wound bimetal strip which preferably has its high-expansion metal towards the outside. One end is fastened to a cam shaft bushing 36 which is integrally fastened centrally of the cam member 37 by means of a laterally supporting cam arm 38. The opposite end of the actuator 35 is fastened to the free inner end of a spirally-formed bimetallic compensator 39. The bimetallic compensator is securely fastened to an insulating member 40 projecting from one side of the base 20 of the frame assembly. The compensator 39 preferably has its high-expansion metal towards the inside of the spiral and is provided to compensate for variations in ambient temperature affecting the actuator 35 by re-indexing the stable end of the helical actuator.

The prime mover provides a rotational motion which is substantially a linear function of the candle power and/or the current supplied to the lamp 8. To provide this motion, the preferred method of wiring the prime mover and the lamp 8 is to connect one terminal of the lamp through a lead 45 to an upright line terminal 46. The opposite terminal of the lamp is connected through a lead 47 to one end of the bimetallic actuator 35. As shown in Fig. 2, the lead 47 is connected to the end of the actuator terminating in the compensator 39. The opposite end of the current-responsive bimetallic actuator 35 is connected through a lead 48 to a line terminal 49. A convenient and inexpensive electrical circuit may be provided, as shown, with one "hot" line connection 50 and a ground connection 51. Thus, the lead 48 need not be insulated, inasmuch as it is merely a ground connection.

Figure 4:
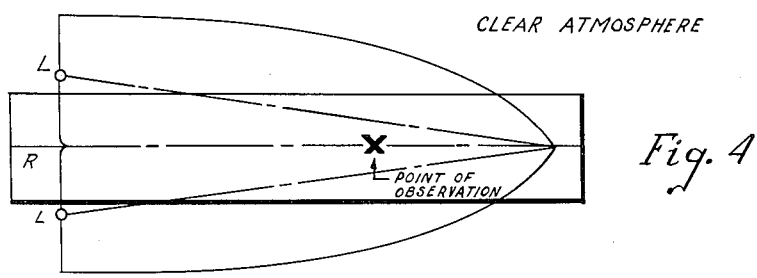
Figs. 4, 5, 6 and 7 are diagrammatic drawings illustrating the effect of restricted visibility on projected light signals.

As has been stated above, the prime mover provides a rotational motion which is substantially a linear function of the current supplied to the prime mover and the light source 8. This has not been found to be particularly desirable from an effective operating standpoint. The present invention provides an improved beam-control mechanism which will operate to give a desired exponential relationship. This will be clearly shown from a study of Figs. 4–7, wherein Fig. 4 is an illustration showing the effective light envelope, in a clear atmosphere, of two lights of correct distribution on opposite sides of the runway. Each light, designated by the reference character L, is equally visible at the correct brightness along the center line of the runway R. It is to be noted that under relatively clear atmospheric conditions the intensity of the projected light signal is of a comparatively low value. This low intensity beam is generally more than enough to guide an approaching airplane positioned at the point X with relation to the runway and the lights. It is the usual practice to position a series of lights along the runway in parallel relationship to one another. A system of this nature has been described and claimed in the Patent No. 2,155,295, issued to John B. Bartow on April 18, 1939. His system of light distribution has been in effective operation throughout the world for a considerable period of time.

Figure 5:
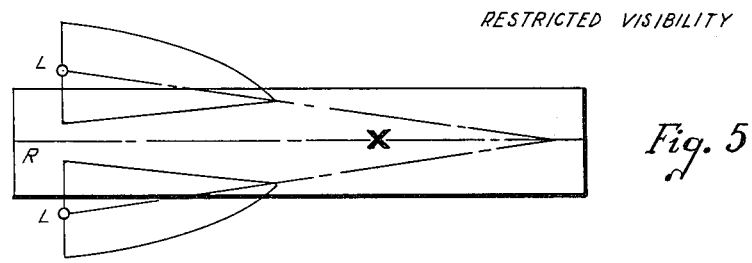

The illustration of Fig. 5 shows how the light envelope shrinks during restricted visibility, such as fog or snow conditions. It is assumed for the sake of explanation that the only change between Fig. 4 and Fig. 5 is the fact that the visibility from the point of observation X, has become comparatively restricted. The intensity of the signal emitted by the lamp has not been changed. Penetration of the higher candle power beams is materially reduced more than that of the lower candle power beams. This will be apparent from a study of Allard's Formula, wherein, $$I = \frac{ED^2}{T^d}$$

When:

$I$ = The intensity of the light source in candle power.
$E$ = The apparent intensity of the source at the point of observation, or the illumination produced at a point of observation by the direct rays from the source. Any desired unit of measurement may be used, but must be in the same units that are used in D. (The threshold of visibility of the dark adapted eye is useful in determining candle power requirements. An accepted value in terms of the metric system would be .2 kilometer candle, which means .2 candle power viewed at a distance of one kilometer in an ideal atmosphere.)
$D$ = The distance from the source to the observer in units corresponding to those used for E. If the illumination E is in kilometer candles, the distance D must be measured in kilometers.
$T$ = The decimal expression of the percentage, per unit distance of light from a source that is not absorbed by particles in the atmosphere.
$d$ = The distance from the source to the observer as in D, however it is in the terms of the units used in specifying the transmission of the atmosphere. For example, if T is the per cent transmission per 100 meters, $d$ is the number of one hundred meter intervals from the source to the observer.

Figure 6:
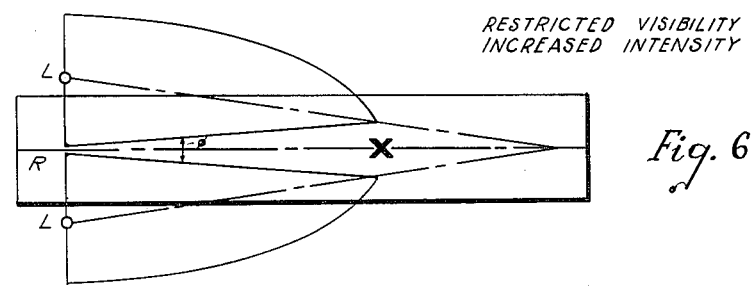
Figure 7:
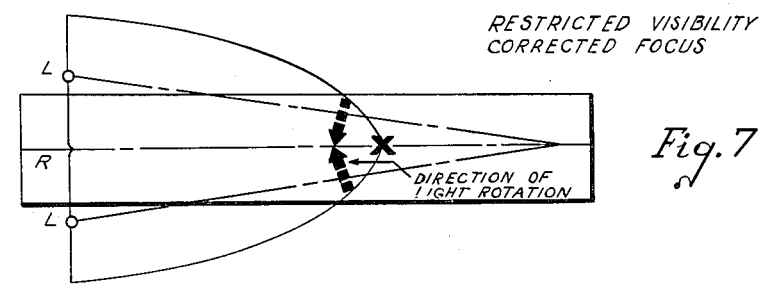

To go on momentarily, Fig. 6 illustrates how merely increasing the output of the lamps L does not restore the path of equal brightness. Here the intensity of the light source has been increased to a position where the main projected beam will penetrate the adverse weather condition to the point parallel to X, as measured from the light source. As indicated in the figure, and as may be calculated from the above formula, the increase of candle power increases the penetration of the low candle power beam more than it does that of the higher candle powers, thus leaving a dark path measured by the angle $\phi$, from which the light is not visible. Only by refocusing and rotating the axis of the maximum candle power beam toward the center line of the runway, as shown in Fig. 7, can the dark area $\phi$ be eliminated and the path of equal brightness be restored. Thus brightness and angular beam control permit adjustment of the lights to give maximum penetration for any given atmospheric condition.

The present invention has for its main object the refocusing and rotation of the axis of the maximum candle power beam in an effective functional relationship to eliminate the dark area measured by the angle $\phi$. It may be shown that this refocusing arrangement is not a linear function of the candle power, but requires a proportionally greater angle of rotation with relation to the light signal emitted at the higher candle power values required to penetrate relatively severe weather conditions. This refocusing arrangement may be effectively accomplished by means such as the cam specifically illustrated in Fig. 3, or by other means such as a linkage, which will be described herein below with reference to Fig. 8. The cam or the linkage acting in combination with the prime mover (in this case the bimetallic actuator 35) provide a deflection of the light beam in the desired functional relationship to the candle power emitted by the main signal beam, which will, for all practical purposes, eliminate the dark path measured by the angle $\phi$ no matter the existing weather condition. Attention is now directed to Fig. 3, wherein the mechanism comprises a stationary frame assembly including the trunnion 23 (partially shown) projecting upwardly from the base 20. The trunnion acts as a rigid support for the pivoted cradle assembly 25. As mentioned above, the lamp 8 is securely positioned on the cradle assembly and moves with that assembly as will be described hereinbelow. The leg 60 of the cradle preferably has a pivot pin 61 integrally positioned at its upper end. The pin 61 is adapted to be supportingly received by a pivot opening in the trunnion 23 (not shown) and is free to rotate therein.

The lower portion of the leg 60 of the cradle assembly is extended outwardly to receive a cam roller 62. The cam roller is free to rotate in either direction and is positioned to be received by the cam slot 64 in the cam 37. The cam 37 is rigidly mounted on the cam shaft bushing 36 projecting from the actuator 35. The cam arm 38 acts as an additional strengthening member and is slotted at its lower end to receive a nut and bolt assembly 65 which acts as a tightening means for securing the cam to the bushing 36.

Figures 3, 8:
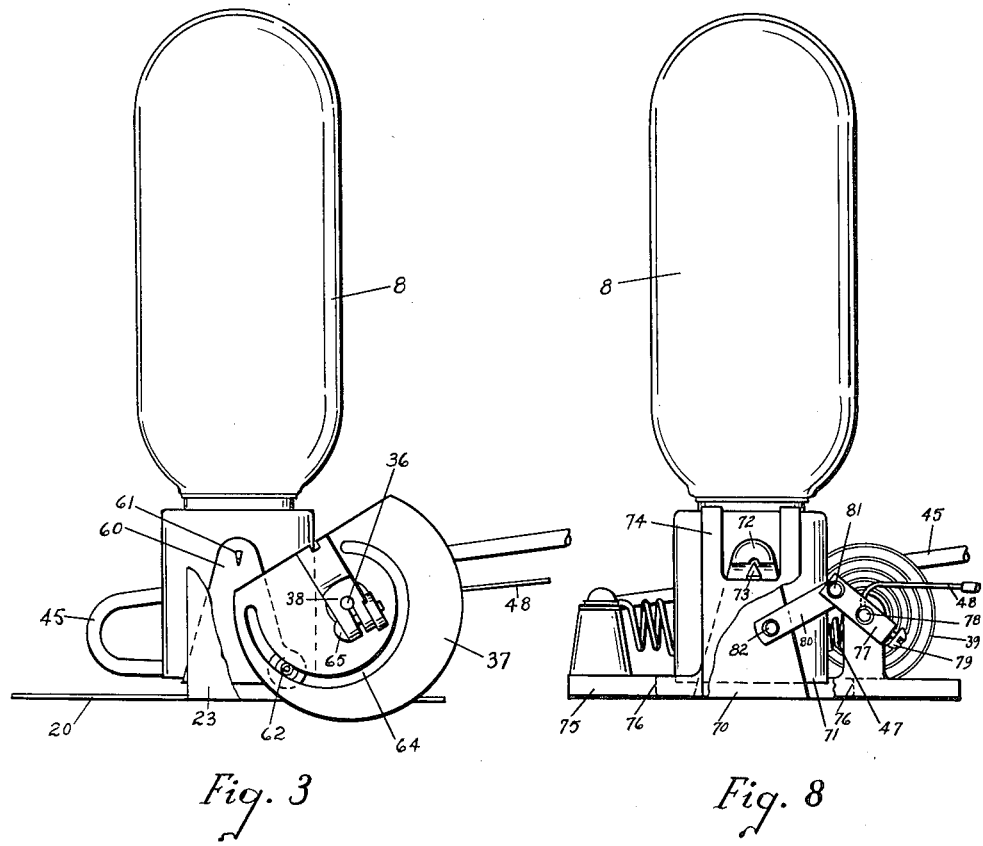
Fig. 3 is a fragmentary view of the lamp structure showing the novel tailoring means in the form of an eccentric cam.
Fig 8 is a fragmentary view of another embodiment of the lamp structure utilizing a linkage as the tailoring means controlling deflection of the light signal.

For the sake of clearness, the major portion of the trunnion 23 has been omitted from Fig. 3. However, it will be apparent that it is necessary to provide an opening (not shown) in the trunnion to permit the cam roller to rotate about the pivot pin 61 without being obstructed by the trunnion member. It will be obvious that other supporting means for the pivoted cradle member may be made without departing from the scope of this invention, and which permit free action of the cam roller. The cam slot 64 has been particularly designed to actuate the cam roller in a manner that will give the effective functional relationship between the deflection of the light beam and the candle power emitted by that beam. The cam 37 is adapted to be rotated directly about the bushing 36, which is also directly motivated by the bimetallic actuator 35. It will be noted that the particular configuration described by the cam slot 64 approximates an Archimedean spiral. Thus, the rotational motion of the cam 37 about the bushing 36 will act to rotate the cam roller 62 about the pivot point provided by the pivot pin 61 and an opening adapted to receive the pivot pin (not shown) in the trunnion 23.

The preferred configuration of the spirally-shaped cam slot provides movement of the cam roller within the practical operating limits of the actuator 35. Assume that the cam is adapted to rotate in a clock-wise direction as current is supplied to the lamp structure. Inasmuch as it has been found particularly desirable to connect the prime mover and the lamp in series relationship, it will be seen that as more current is supplied to the lamp and the actuator 35, the cam 37 will rotate about the bushing 36 in a uniform manner approximating a linear relationship with the current supplied. Thus, according to the present invention, it will be seen that the slot 64 provides a relatively rapid motion towards the end of the travel corresponding to the increased energy required by and supplied to the lamp. The cam roller, responding to the motion of the slot 64, will correspondingly rock the cradle assembly 25 in direct relationship therewith.

The term "Archimedean spiral" is intended to be considered in its broadest aspect. That is, the cam surface configuration approximating this mathematical definition provides a means of translating the substantially uniform motion of the prime mover into a motion having a progressively increasing velocity as the prime mover advances responsive to the current supplied thereto. As shown, the cam surface constitutes only a relatively small portion of the spiral configuration and may be extended or reduced in length and remain within the broad scope of the definition.

Referring now to the embodiment of Fig. 8, the motion translating, or tailoring means takes the form of a mechanical linkage. The present embodiment is shown composed primarily of cast members, although it will be apparent that this substitution of manufacturing details will not materially affect the operation of the prime mover and/or motion translating means. In fact, the linkage hereinafter described may be substituted directly for the cam of Figs. 1, 2 and 3 with very little modification of the component parts without departing from the scope of the invention. Like parts are designated by the same reference characters that have been used to describe the embodiment of Figs. 1, 2 and 3.

The present embodiment comprises a U-shaped cradle member 70, which supports the projector lamp 8 at its insulating base 71. The cradle is pivotally supported at its upper end by means of integral support members 72 extending outwardly normal to the cradle leg portions at either side of the cradle member. The support members 72 rest upon pivot points 73 which may be insert bearing members, or cast as an integral portion of the trunnions 74 of the stationary frame member 75. The base of the frame member is preferably provided with an opening 76, defined by the dotted surfaces, which permits the cradle to rock free of obstructing portions.

The motion translating, or tailoring means of this embodiment comprises a linkage mechanism which preferably consists of a crank 77 secured to the drive shaft 78 by means of an indexing set screw 79. The opposite end of the crank is pivotally joined with a connecting link 80 by the pin 81. The drive shaft 78 is rigidly secured to the drive end of the prime mover (not shown), which may be in the form of the bimetallic actuator 35 described more fully in connection with Figs. 1, 2 and 3. The ambient temperature compensator is indicated by the reference character 39. The connecting link 80 is pivotally connected to the cradle member 70 by means of a pivot pin 82.

The operation of the present embodiment is substantially identical to that of the previously described embodiment. As shown in Fig. 8, when the prime mover is energized, the crank 77 will rotate in a clockwise direction to a predetermined position responsive to the energy supplied. As shown, the lamp cradle member 70 is positioned substantially vertically of the frame assembly, which is not necessarily the minimum or the maximum setting of the lamp. It will be obvious that motion of the crank, when it is approximately horizontal (not shown), will be reflected less rapidly in the connecting rod-cradle pivot pin 82 than when the crank is approaching the vertical position. Thus the substantially uniform motion of the crank 77 about the shaft 78 will cause a relatively more rapid rocking motion of the lamp as the crank moves from an approximately horizontal to a vertical position on its shaft. Thus, the linkage mechanism of the present embodiment will cause a substantially identical movement of the lamp responsive to the current supplied as that of the embodiment of Figs. 1, 2 and 3. As suggested, it is preferred to electrically connect the lamp circuit in series with the actuator circuit.

It will be apparent that other means of providing the desired functional relationship between the current supplied to the light source and the movement of the light source may be accomplished by mechanical movements such as elliptical gears (not shown) which will provide a relatively more rapid motion to the lamp cradle as more current is supplied to the actuator. The above-described runway light projector is readily adaptable for use in conjunction with established practice, and may be substituted for or used jointly with existing controlled-beam runway or contact lights. The improved projector is versatile, in that it may be electrically connected directly in the circuit normally energized in the light source, which negates the added expense and materials for separate control circuits; or the projector may be readily adaptable for connection with proposed or existing circuits utilizing separate pilot control lines and equipment, where it is so desired.

We claim:

1. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a driving member directly responsive to variations in current in said filament and an eccentric motion translating means operatively connected to said driving member, said translating means further being operatively related to said lamp and said lens to translate said direct current responsive drive into a tailored motion throughout a range of eccentric movement for automatically deflecting said light signal angularly inwardly of said runway at an angular velocity exponentially functionally related to an increase in current supplied to said filament.

2. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light emitting intensity of said filament, and a prime mover for moving said lamp and including a driving member directly responsive to variations in current in said filament and an eccentric motion translating means operatively connected to said driving member, said translating means further being operatively related to said lamp to translate said direct current responsive drive into a tailored motion throughout a range of eccentric movement for automatically deflecting said light signal angularly inwardly of said runway at an angular velocity exponentially functionally related to an increase in current supplied to said filament.

3. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a bi-metallic actuator directly responsive to variations in current in said filament and an eccentric motion translating means operatively connected to said actuator, said translating means further being operatively related to said lamp and said lens to translate the direct current responsive motion of said actuator into a tailored motion throughout a range of eccentric movement for automatically deflecting said light signal angularly inwardly of said runway at an angular velocity exponentially functionally related to an increase in current supplied to said filament.

4. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, a prime mover operatively related to said lamp and lens and including a bi-metallic actuator directly responsive to variations in current in said filament and an eccentric motion translating means operatively connected to said actuator, said translating means further being operatively related to said lamp and said lens to translate the direct current responsive motion of said actuator into a tailored motion throughout a range of eccentric movement for automatically deflecting said light signal angularly inwardly of said runway at an angular velocity exponentially functionally related to an increase in current supplied to said filament, and an ambient temperature compensator for said actuator.

5. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a driving member directly responsive to variations in current in said filament, a cam operatively connected to said driving member and having a cam surface configuration approximating an Archimedean spiral, and a cam follower operatively related to said lamp and said lens to translate said direct current responsive drive into a tailored motion throughout a range of eccentric movement for automatically deflecting said light signal angularly inwardly of said runway at an angular velocity exponentially functionally related to an increase in current supplied to said filament.

6. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a driving member in electrical connection with said filament and being directly responsive to current variations in said filament, a cam operatively connected to said driving member and having a cam surface configuration approximating an Archimedean spiral, and a cam follower operatively related to said lamp and said lens to translate said direct current responsive drive into a tailored motion throughout a range of eccentric movement for automatically deflecting said light signal angularly inwardly of said runway at an angular velocity exponentially functionally related to an increase in current supplied to said filament.

7. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light emitting intensity of said filament, and a prime mover for moving said lamp and including a driving member in electrical connection with said filament and being directly responsive to current variations in said filament, a cam operatively connected to said driving member and having a cam surface configuration approximating an Archimedean spiral, and a cam follower operatively connected to said lamp to translate said direct current responsive drive into a tailored motion throughout a range of eccentric movement for automatically deflecting said light signal angularly inwardly of said runway at an angular velocity exponentially functionally related to an increase in current supplied to said filament.

8. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a bi-metallic actuator directly responsive to variations in current in said filament, a cam operatively connected to said actuator and having a cam surface configuration approximating an Archimedean spiral, and a cam follower operatively related to said lamp and said lens to translate the direct current responsive motion of said actuator into a tailored motion throughout a range of eccentric movement for automatically deflecting said light signal angularly inwardly of said runway at an angular velocity exponentially functionally related to an increase in current supplied to said filament.

9. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light emitting intensity of said filament, and a prime mover for moving said lamp and including a bi-metallic actuator in electrical connection with said filament and being directly responsive to current variations in said filament, a cam operatively connected to said actuator and having a cam surface configuration approximating an Archimedean spiral, and a cam follower operatively related to said lamp to translate the direct current responsive motion of said actuator into a tailored motion throughout a range of eccentric movement for automatically deflecting said light signal angularly inwardly of said runway at an angular velocity exponentially functionally related to an increase in current supplied to said filament.

10. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a bi-metallic actuator directly responsive to variations in current in said filament, a cam operatively connected to said actuator and having a cam surface configuration approximating an Archimedean spiral, and a cam follower operatively related to said lamp and said lens to translate the direct current responsive motion of said actuator into a tailored motion throughout a range of eccentric movement for automatically deflecting said light signal angularly inwardly of said runway at an angular velocity exponentially functionally related to an increase in current supplied to said filament, and an ambient temperature compensator for said actuator.

11. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light emitting intensity of said filament, and a prime mover for moving said lamp and including a bi-metallic actuator in electrical connection with said filament and being directly responsive to current variations in said filament, a cam operatively connected to said actuator and having a cam surface configuration approximating an Archimedean spiral, and a cam follower operatively related to said lamp to translate the direct current responsive motion of said actuator into a tailored motion throughout a range of eccentric movement for automatically deflecting said light signal angularly inwardly of said runway at an angular velocity exponentially functionally related to an increase in current supplied to said filament, and an ambient temperature compensator for said actuator.

12. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a driving member directly responsive to variations in current in said filament and a mechanical linkage operatively connected to said driving member and further being operatively related to said lamp and said lens to translate said direct current responsive drive into a tailored motion throughout a range of eccentric movement for automatically deflecting said light signal angularly inwardly of said runway at an angular velocity exponentially functionally related to an increase in current supplied to said filament.

13. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp being movable transversely of said geometric axis for projecting said light signal in a predetermined direction relative to said runway at a predetermined light emitting intensity of said filament, and a prime mover operatively related to said lamp and lens and including a driving member directly responsive to variations in current in said filament and mechanical linkage operatively connected to said driving member and further being operatively connected to said lamp to translate said direct current responsive drive into a tailored motion throughout a range of eccentric movement for automatically deflecting said light signal angularly inwardly of said runway at an angular velocity exponentially functionally related to an increase in current supplied to said filament.

14. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a bi-metallic actuator directly responsive to variations in current in said filament and a mechanical linkage operatively connected to said actuator and further being operatively related to said lamp and said lens to translate the direct current responsive motion of said actuator into a tailored motion throughout a range of eccentric movement for automatically deflecting said light signal angularly inwardly of said runway at an angular velocity exponentially functionally related to an increase in current supplied to said filament.

15. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a bi-metallic actuator directly responsive to variations in current in said filament, and a mechanical linkage including a crank member operatively connected to said actuator and a connecting rod operatively related to said lamp and said lens to translate the direct current responsive motion of said actuator into a tailored motion throughout a range of eccentric movement for automatically deflecting said light signal angularly inwardly of said runway at an angular velocity exponentially functionally related to an increase in current supplied to said filament.

16. A marker light for an airport runway including in combination a lamp having a light emitting filament arranged for connection with an electrical circuit having a variable control with predetermined maximum and minimum variable limits, a lens having a focusing portion for projecting a light signal emanating from said filament in a predetermined direction relative to the geometric axis of said lens, said lamp and said lens being relatively movable transversely of said geometric axis for projecting said light signal in a predetermined direction relative to said runway at a predetermined light emitting intensity of said filament, and a prime mover operatively related to said lamp and lens and including a bi-metallic actuator directly responsive to variations in current in said filament, and a mechanical linkage including a crank member operatively connected to said actuator and a connecting rod operatively related to said lamp and said lens to translate the direct current responsive motion of said actuator into a tailored motion throughout a range of eccentric movement for automatically deflecting said light signal angularly inwardly of said runway at an angular velocity exponentially functionally related to an increase in current supplied to said filament, and an ambient temperature compensator for said actuator.

References Cited in the file of this patent

UNITED STATES PATENTS

| | | |
|---|---|---|
| 1,639,365 | Brown | Aug. 16, 1927 |
| 1,647,890 | Sell | Nov. 1, 1927 |
| 1,700,226 | House | Jan. 29, 1929 |
| 1,861,752 | Patterson | June 7, 1932 |
| 2,282,208 | Parsberg | May 5, 1942 |
| 2,556,870 | Clark | June 12, 1951 |
| 2,582,742 | Bartow | Jan. 15, 1952 |

OTHER REFERENCES

Landing Aids Experiment Station final report 1947 on Airfield Lighting, pp. 7 and 8 cited.